United States Patent [19]

Allport

[11] 4,017,184
[45] Apr. 12, 1977

[54] APPARATUS FOR COPYING TRANSLUCENT DOCUMENTS

[76] Inventor: Walter F. Allport, R.D. No. 3, Norwich, N.Y. 13815

[22] Filed: May 5, 1975

[21] Appl. No.: 574,441

[52] U.S. Cl. .................................. 355/109; 355/29
[51] Int. Cl.$^2$ .......................................... G01B 9/02
[58] Field of Search ................ 355/12, 13, 29, 104, 355/106–110

[56] References Cited

UNITED STATES PATENTS

| 2,732,778 | 1/1956 | Limberger | 355/107 |
| 3,503,677 | 3/1970 | Uchiyama | 355/13 |
| 3,651,727 | 3/1972 | Suzuki et al. | 355/13 X |
| 3,656,851 | 4/1972 | Kakii et al. | 355/13 X |
| 3,684,373 | 8/1972 | Berge | 355/29 X |
| 3,813,163 | 5/1974 | Kobayashi | 355/110 X |

Primary Examiner—Richard L. Moses
Attorney, Agent, or Firm—Bradford S. Allen

[57] ABSTRACT

Apparatus for automatically copying information contained on sheets of translucent material such as microfilm cards when such master sheet is loaded into the apparatus and dials on the control panel are set to the desired number of copies. The device includes subsystems for unwinding, exposing, cutting and developing a web of sensitized copy material on a continuous flow basis. A control system causes the device to wrap the translucent master sheet around a transparent printing cylinder during exposure and to cut the web of copy material in the proper relationship to the exposed images. The transparent printing cylinder has an outside circumference which is approximately equal to the distance between the locations at which the web of copy material is cut.

1 Claim, 6 Drawing Figures

APPARATUS FOR COPYING TRANSLUCENT DOCUMENTS

BACKGROUND AND OBJECTS OF THE INVENTION

The large growth in document copying activity is well known and there has been a continuing need for more efficient, more convenient and lower cost means for making copies. Within a broad range of types of documents to be reproduced there is information contained on sheets of translucent material, such as microfilm cards.

Heretofore, copies of translucent documents, such as microfilm card originals or "masters", have been made in various ways including the manual feeding of exposure devices and developing devices, and recently by automatic devices which expose, develop and cut a web of copy material on a step-and-repeat basis. Generally such automatic machines have had large physical dimensions and power requirements and have been costly to purchase and operate.

Accordingly, one object of the present invention is to provide a relatively low cost means for automatically producing copies of a translucent master sheet.

Another object of the invention is to provide a compact, table-top device than can automatically produce multiple copies of a translucent master sheet.

Still another object of the invention is to provide a device capable of exposing, cutting and developing sensitized copy material on a continuous flow basis without intermittent starting and stopping.

Other objects of the invention will be obvious and some appear hereinafter.

The invention accordingly comprises the features of construction, combinations of element, and arrangements of parts which will be exemplified in the constructions hereafter set forth.

For a fuller understanding of the nature and objects of the invention, reference should be had to the following detailed description taken in connection with the accompanying drawings, in which.

DESCRIPTION OF THE INVENTION

Figure 1:
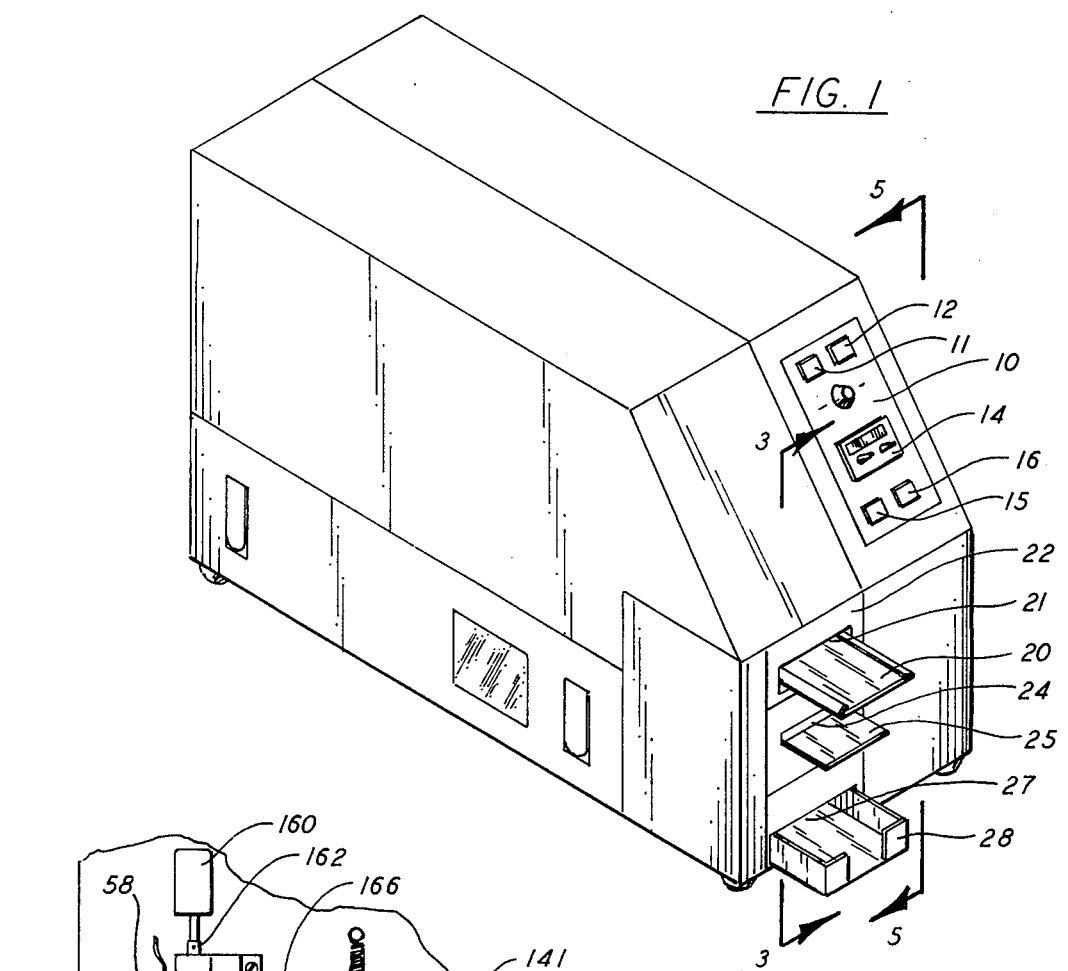
FIG. 1 is a perspective view of the apparatus showing, from top to bottom, control panel, master sheet input opening, master sheet output opening, and copy sheet output opening.

Referring now in greater detail to FIG. 1 of the drawings, a control panel 10 contains an on-off switch 11. When the apparatus is ready for use, "ready" light 12 turns on indicating that the copy developing system has been warmed. A translucent "master" sheet is loaded in master input guide 20, and slid into master input opening 21, in top front cover 22. The number of copies desired is set on the dials of counter 14, and the "print" switch 15 is pressed, which starts the copying automatic process. As copies are exposed, cut and developed, they are delivered through the copy output opening 27, and into copy output tray 28. When the last copy has been exposed, the master sheet is delivered through the master output opening 24, onto the master output tray 25. The apparatus is then ready to accept another master from which more copies are automatically made.

Figure 2:
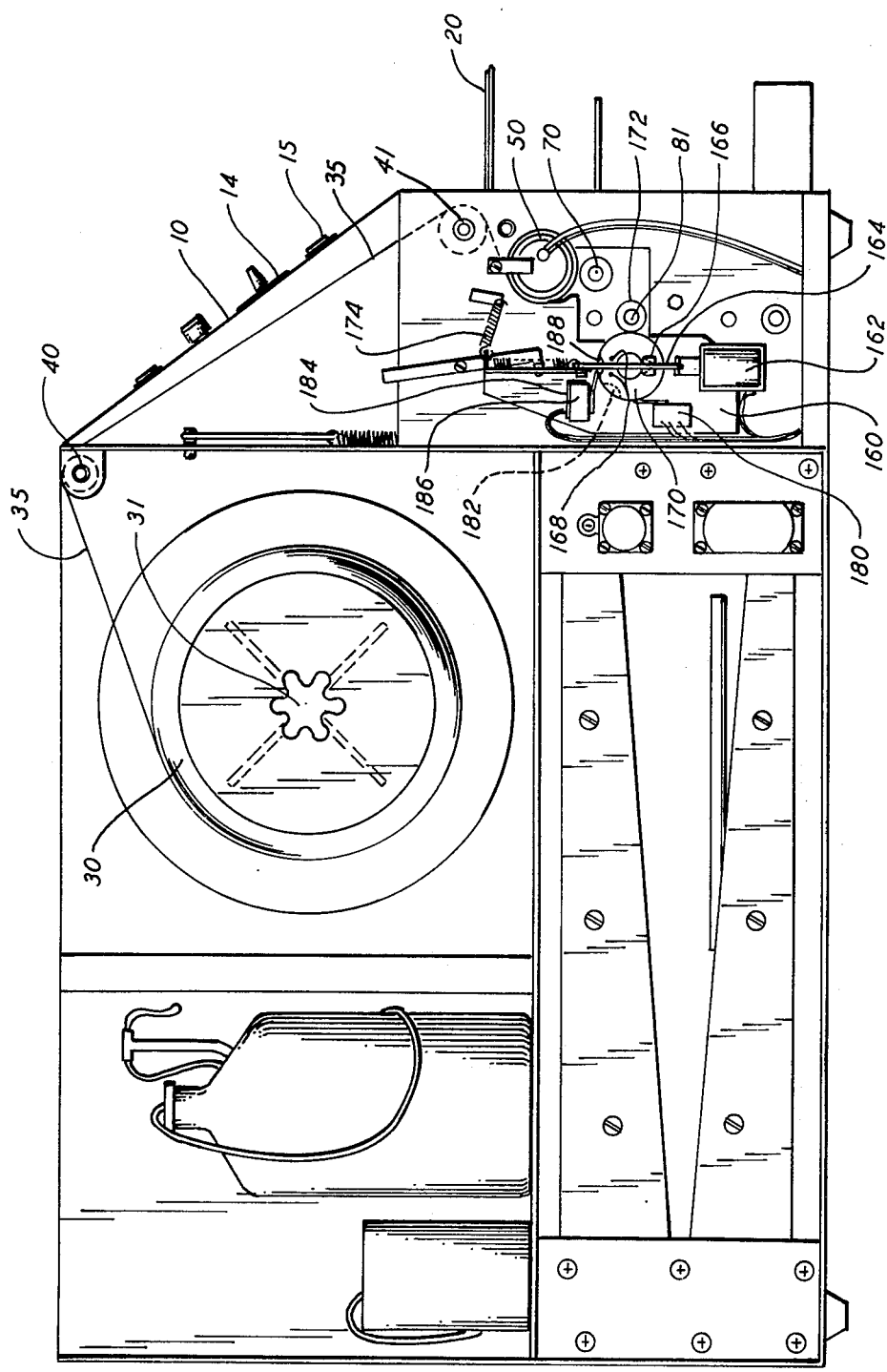
FIG. 2 is a left side view with the left side covers removed to show a roll of copy material mounted within the apparatus.

Reference will now be had to FIG. 2 of the drawings, which shows the roll of sensitized copy mterial 30, mounted on supply hub 31. As the web of copy material 35 is pulled from supply roll 30, it passes over first guide roller 40 and second guide roller 41. When a master film card is inserted into the apparatus via master input guide 20, it comes in contact with web of sensitized copy material 35 and the master and copy material remain in contact until the copy material has been exposed through the master.

Figure 3:
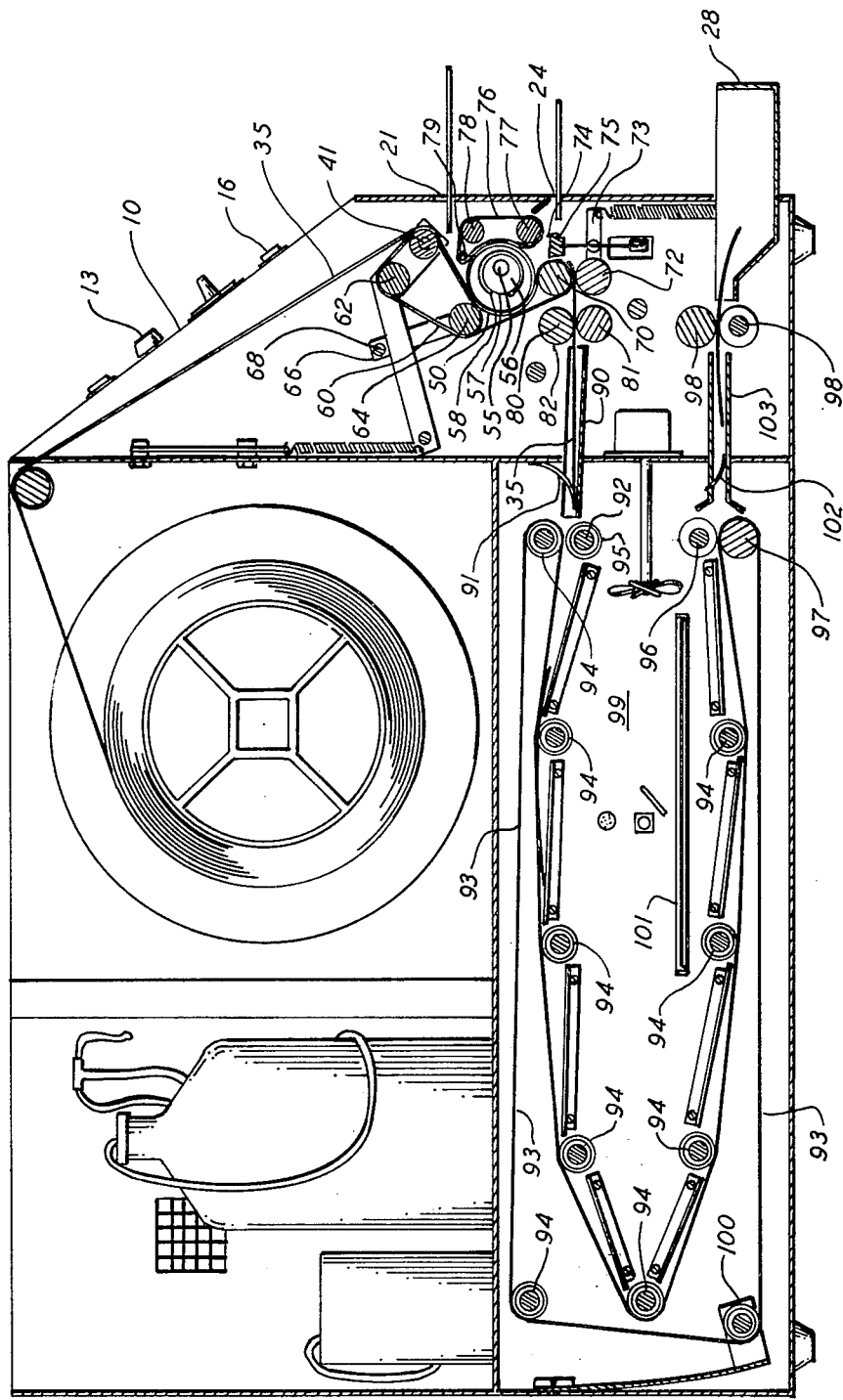
FIG. 3 is a vertical cross sectional view taken along line 3—3 of FIG. 1.

Referring now to FIG. 3, which is a sectional view through the apparatus taken along line 3—3 of FIG. 1, a more complete understanding can be had of a means whereby the copy material may be exposed, cut and developed. After copy material web 35 passes around second guide roller 41 it then passes around a transparent printing cylinder 50 where it converges with a translucent master sheet which has been inserted into the apparatus through master input opening 21. As the web of copy material and master sheet pass around printing cylinder 50, a lamp 55 within the printing cylinder illuminates the master and, in areas where the master is translucent, it exposes the copy material and in areas where the master is opaque, the copy material is unexposed.

Lamp 55 is housed in an optical assembly which is comprised of a reflector 56, a heat radiation absorbing filter 57, and a shutter 58. When copies are not being made, shutter 58 is moved over the optical filter 57 to keep the lamp's light from exposing the unexposed web of copy material.

During exposure the web of copy material is held in contact with the master by exposure belt 60 which is placed under tension by a spring loaded tension roller 62, and by an exposure roller 64 which is pressed against the web of copy material by exposure belt 60. Exposure roller 64 is supported at each end by bearings mounted in pivot arms 66 which are free to swing about pivot point 68 thus providing exposure roller 64 with a floating action against copy material 35.

After being exposed, the web of sensitized copy material 35 passes around main drive roller 70 which is the means by which the web of copy material is unwound and transported around printing cylinder 50. The copy material 35 and exposure belt 60 are pressed against main drive roll 70 by drive nip roller 72 which is mounted in pivot arms 73 which are mounted so as to spring load nip roller 72 against main drive roller 70. Thus when drive roller 70 is rotated by the copier's main drive motor (not shown in this figure) the web of copy material 35 advances at a steady speed through the copier, the speed being determined by the speed of the motor which can be adjusted by the operator via speed control knob 13 on control panel 10.

When more than one copy is to be made, recycle guide 75 is automatically moved upward around main drive roller 70 so that when the leading edge of a master attempts to move out of the copier via master exit opening 24 the master is plowed upward between recycle belts 76 and printing cylinder 50. Recycle belts 76 are of an elastic material and pass around flanged back-up roller 77, smooth back up roller 78 and recycle belt roller 79. These belts recycle the master sheet around the transparent printing cylinder 50 as many times as is necessary to produce the desired number of copies. When the last copy has been exposed, recycle guide 75 automatically drops down to permit the master film card to exit from the copier through master output opening 24.

After exposed web of sensitized copy material 35 passes betwen main drive roller 70 and drive nip roller 72 it moves between cut roller 80 and cut back up roller 81 which comprises a crush type cutter. When cut roller 80 is rotated so that blade 82 would come in contact with cut back up roller 81 the intervening web of copy material is caused to be cut.

Referring still to FIG. 3 of the drawings, at the time copy material web 35 is cut, the leading edge of the web of copy material has been directed by developing chamber entrance guide 90 through developing chamber wiper seal 91 and to the juncture of developing chamber input nip roller 92 and developing chamber belt 93 which passes around idler roller 94. Rubber tires 95 are mounted on input nip roller 92 and on output nip roller 96. These two rollers, chamber belt drive roller 97 and two copy exit rollers 98 are driven at a contant speed by chamber drive motor (not shown). Cut sheets of copy material 35 are propelled through developing chamber 99 by developing chamber belt 93 which passes around idler rollers 94 and belt tension roller 100 which is spring loaded against back wall of chamber. As each copy sheets reaches the line of contact between chamber belt 93 and each idler roller 94 it continues to be propelled by the belt. As the copy sheets move through the chamber they are developed by an ammonia vapor created when an operator presses the "ammonia" switch 16 on control panel 10 which causes a solenoid valve to be opened, permitting aqueous ammonia from a pressurized ammonia source to be injected onto a hot tray 101 within the chamber wherein the aqueous ammonia is caused to vaporize.

When the copy sheets reach the belt drive roller 97 and exit nip roller 96 they are propelled through exit wiper seal 102 and through chamber exit guide 103 to the junction of copy exit rollers 98 which propel the copy sheets through the copy exit opening and into the copy exit tray 28. That an ammonia type developing system is discussed in conjunction with the previously discussed exposing and cutting systems is not intended to infer that a heat developing system can not be used for processing vesicular type films or that other type processors can not be employed for developing other type of copy material.

Figure 4:
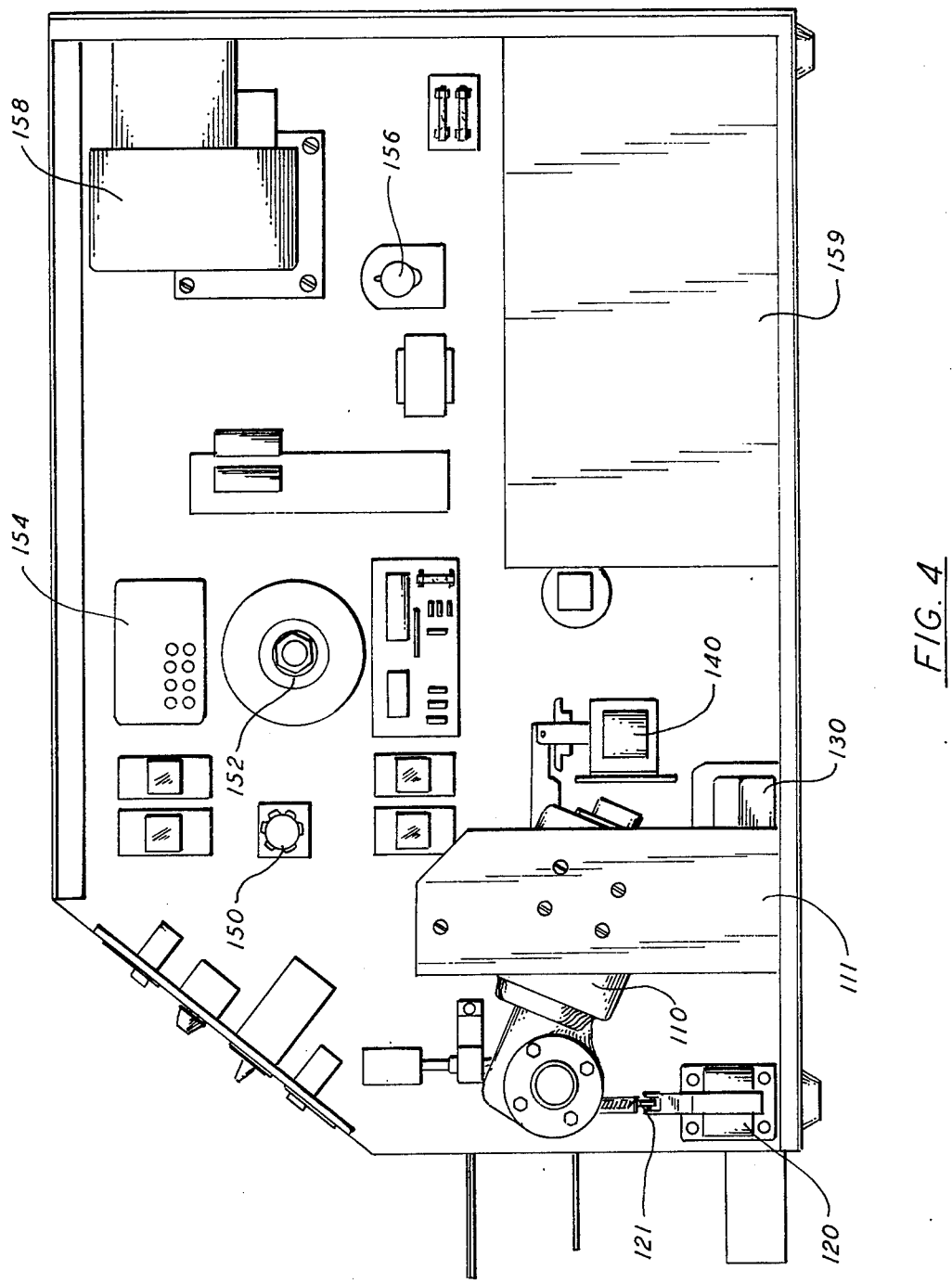
FIG. 4 is a right side view of the apparatus with the right side cover removed to show, from left to right, recycle solenoid, main drive motor, developing chamber drive motor, electrical control components, exposure lamp power supply housing, and lamp cooling blower.

Reference will now be had to FIG. 4 which shows main drive motor 110 mounted on motor bracket 111. Shown also is recycle solenoid 120 which, via mechanical linkage 121, actuates recycle guide 75 of FIG. 3. Still referring to FIG. 4, cut solenoid 140 releases a clutch mechanism to rotate cut roller 82 of FIG. 3. Also shown in FIG. 4 are stop delay relay 150, film supply hub brake 152, ammonia pressure pump 154, ammonia control solenoid valve 156, lamp cooling blower 158, and lamp power supply housing 159.

Figure 5:
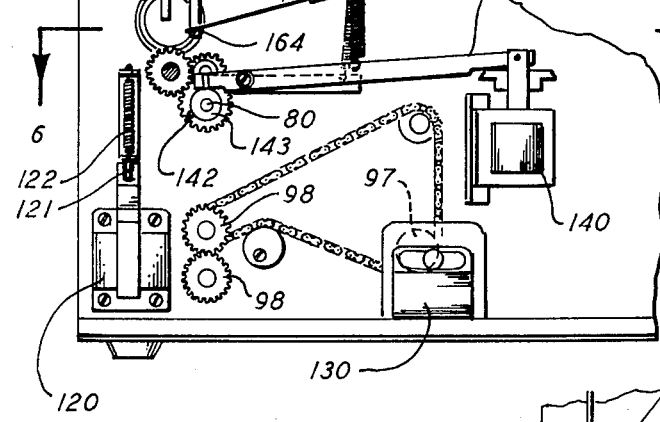
FIG. 5 is a partial sectional view taken along line 5—5 of FIG. 1.

Referring to FIG. 5 of the drawings, a sectional view along line 5—5 of FIG. 1, shutter solenoid 160 is connected via linkage 162 to control rod 164 which is mounted on shutter 58. When shutter solenoid 160 is energized, shutter 58 is caused to open. When shutter solenoid 160 is deenergized, shutter is closed by a combination of gravitational and spring wire 166 forces. Recycle solenoid 120 is connected via recycle pivot link 121 and recycle push link (not shown) to recycle guide 75 of FIG. 3. When recycle solenoid 120 is energized, it closes causing recycle guide 75 to move to its upward position. When recycle solenoid 120 is deenergized, it is pulled open by recycle return spring 122, causing recycle guide 75 to move to its downward position. Chamber drive motor 130, drives chamber belt drive roller 97 and copy exit rollers 98 as discussed in connection with FIG. 3.

Shown also in FIG. 5 is cut solenoid 140 which, when energized, actuates cut pivot lever 141, to release pin 142 in single revolution clutch 143 which is mounted on end of cut roller shaft 80. When clutch pin 142 is released, clutch 140 is engaged and cut roller 80 is rotated causing copy material to be cut.

Figure 6:
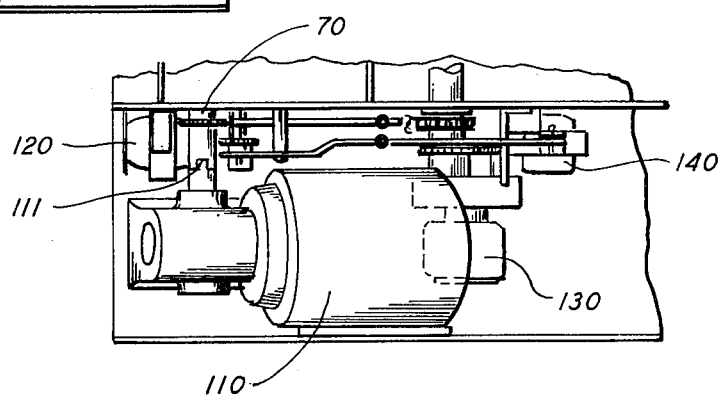
FIG. 6 is a plan view of the interior of the apparatus taken along line 6—6 of FIG. 5.

Referring to FIG. 6 of the drawings, main drive motor 110 is connected to main drive roller shaft 70 by flexible coupling 111. Also shown in this plan view are cut solenoid 140, chamber drive motor 130 and recycle solenoid 120.

Referring back to FIGS. 2 and 3 of the drawings, the synchronization system body 160 of FIG. 2 is shown on which are mounted components for counting the number of copies as they are produced, for locating the cutting of the copy material in proper registration to the exposed images on the copy material and for stopping the copier after the desired number of copies have been produced. As the leading edge of a translucent master is plowed upward by recycle guide 75 of FIG. 3, the leading edge of the master actuates synchronization switch 74. This switch causes a relay to close and energize synchronization solenoid 162 of FIG. 2 which is mounted on synchronization system body 160. When synchronization solenoid 162 closes, synchronization slide arm 164 is pulled downward moving V-shaped cam 166 between two pins 168 protruding from synchronization wheel 170. When the copier is in operation, synchronization wheel 170 is rotated by drive collar 172, against which it is lightly loaded by spring 174. Drive collar 172 is mounted on cut back up roller shaft 81 which is driven through gears by main drive roller shaft 70. Drive collar 172 is tapered so that, by adjusting it in an in-and-out direction on cut back up roller shaft 172, the speed at which synchronization wheel 170 moves can be adjusted with respect to the speed of the copy material 35.

Also shown in FIG. 2 is cut microswitch 180 which is actuated when its follower drops into cut out 182 (shown by dotted line) in the far side of the synchronization wheel 170. This actuates cut solenoid 140 of FIG. 5 which moves cut pivot lever 141 releasing cut clutch 143 and cut roller 80 as previously described in reference to FIG. 5. Shown also in FIG. 2 is count microswitch 184 which also is operated by cut out 182. Stop microswitch 186 opens when its follower drops into cutout 188. When the desired number of copies have been made, and the follower of stop microswitch 186 drops into cutout 188 the copier stops and is then ready for making another series of copies.

The control system, parts of which are shown in several of the drawings, functions in the following sequence. When a master has been loaded into the copier and counter 14 of FIG. 2 on control panel 10 has been set to the desired number of copies, the operator pushes "print" switch 15 which provides power to an electrical control circuit which causes the main drive motor to rotate the main drive roller shaft. (This control circuit remains energized as long as the counter shows more copies to be made, or, if the counter shows no more copies to be made, as long as time delay relay 150 of FIG. 4 remains closed, or, if the counter shows no more copies to be made and the time delay has opened, as long as stop microswitch 186 of FIG. 2 has not opened. When the control circuit is energized, recycle guide 75 of FIG. 3 is held in its upward position as long as the counter shows more copies to be made.) When the drive motor rotates main drive roller 70, the web of copy material 35 and master are advanced around the printing cylinder 50. At the same time, synchronization wheel 170 of FIG. 2 is being rotated by drive collar 172.

When the leading edge of the master reaches recycle guide 75 of FIG. 3 and pushes against trip tab of switch 74, the pins 168 of FIG. 2 in the synchronization wheel 170 have moved approximately in line with cam 166 which is pulled down through pins by synchronization solenoid 162. The purpose of this system is to register the cutting of the copy material in the proper place between the exposed images of the master. Were it not for a synchronization system for this purpose, the location of the cut would move one way or the other with respect to the images on the copy material. The movement might be small for each revolution of the printing cylinder 50, 1/100th inch for example, but by the end of a long run of 50 or 90 copies the cumulative error would be substantial and objectionable.

When cam 166 is pulled between pins 168 it adjusts the synchronization wheel 170 forward or backward. As drive roller 172 continues to rotate, the leading edge of the master moves between recycle belts 76 of FIG. 3 and printing cylinder 50 as it is recycled for another copy. When cut out 182 of FIG. 2 in synchronization wheel 170 reaches the follower of cut microswitch 180 it actuates cut microswitch 180 and starts the cutting sequence. As synchronization wheel 170 continues to rotate, the same cut out 182 actuates count microswitch 184 which causes the presetable counter 14 to step back one number. The synchronization wheel 170 and the master, which is wrapped around printing cylinder 50, continue to rotate in synchronization as copies are produced and the presetable counter counts back toward "00". Finally, when counter 14 reaches "00", the recycle guide drops downward allowing the master to exit from the copier. Were it not for a time delay relay, the copier would stop with the master partly within the machine. However, the time delay relay keeps the control circuit energized for a long enough time to permit the synchronization wheel to cycle one more time. Then when the follower of stop microswitch 186 drops into cut out 188, stop microswitch 186 opens and the copier stops.

What I claim is:

1. An apparatus for automatically copying the image of a translucent master sheet material onto a continuous web of sensitized copying material comprising:

a. a rotationally mounted transparent printing cylinder, adapted to continuously transport a translucent master sheet and a continuous web of sensitized copy material without intermittent stopping and starting; said transparent printing cylinder having a circumference approximately equal to one dimension of the translucent master sheet, and b. means for feeding a translucent master sheet onto the transparent printing cylinder and automatically guiding the translucent master sheet away, after the desired number of multiple copies have been made, and c. means for continuously exposing the image of the translucent master sheet, on the transparent cylinder without intermittent stopping and starting between repetitive exposure upon a continuous web of sensitized copy material, until the desired number of multiple copies have been exposed, and d. means for automatically advancing the exposed web of sensitized copy material at a constant speed and cutting it in synchronization with the locations of the exposed images of the translucent master sheet.

* * * * *